US007522612B1

(12) United States Patent
Brundert et al.

(10) Patent No.: US 7,522,612 B1
(45) Date of Patent: Apr. 21, 2009

(54) TELECOMMUNICATION NETWORK USING THE W-CDMA PROTOCOL WITH AAL-2 BASED TERMINATION POINTS

(75) Inventors: Martin Brundert, Düsseldorf (DE); Faustino Capitan Cuadrado, Ratingen (DE); Juan Ignacio Solana De Quesada, Ratingen (DE)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/070,969

(22) PCT Filed: Sep. 29, 1999

(86) PCT No.: PCT/EP99/07210

§ 371 (c)(1),
(2), (4) Date: Aug. 7, 2002

(87) PCT Pub. No.: WO01/24570

PCT Pub. Date: Apr. 5, 2001

(51) Int. Cl.
*H04L 12/28* (2006.01)
*H04L 12/56* (2006.01)
(52) U.S. Cl. ...................................... 370/398
(58) Field of Classification Search ............. 370/397, 370/394–396, 398, 465, 410, 401, 328, 338, 370/466, 474, 412, 429, 230, 389, 468, 236; 709/224, 395; 455/524, 561, 39, 502, 436; 379/114, 134; 713/600, 500; 718/4
See application file for complete search history.

(56) References Cited

U.S. PATENT DOCUMENTS 6,414,970 B1 * 7/2002 Negishi et al. .............. 370/510

(Continued)

FOREIGN PATENT DOCUMENTS

EP 0 915 634 A2 5/1999

(Continued)

OTHER PUBLICATIONS

"B-ISDN ATM Adaptation Layer Specification: Type 2 AAL", International Telecommunication Union, Series I: Integrated Digital Network, Overall network aspects and functions—Protocol layer requirements, ITU-T Recommendation I.363.2, 21 pages, Sep. 1997.

(Continued)

*Primary Examiner*—Wing F Chan
*Assistant Examiner*—Prenell P Jones
(74) *Attorney, Agent, or Firm*—Squire, Sanders & Dempsey, LLP

(57) ABSTRACT

A telecommunication network using the W-CDMA protocol comprising a variety of base stations (BS) communicating with a central Radio Network Controller (RNC) by an asynchronous transfer mode (ATM) based data connection via an IUB interface, whereby at least one of the base stations (BS) is comprises a variety of radio sectors (1, 2, 3, . . . n) with physically distributed AAL-2 based termination points (TP), each termination point having an AAL-2 over ATM structure where different call ID's are mapped into respective ATM virtual connections (ATM/VC) under the control of a control unit timer (CU-timer) having a determined delay time, and all AAL-2 cell streams being sent parallel to each other to an ATM switching unit via a UTOPIA interface. In order to increase the efficiency of the system without a reduction of the maximum allowed delay, the ATM switching unit comprises a multiplexing unit (AAM CPS MUX) for multiplexing AAL-2 connections of the different termination points (TP) into one single ATM virtual connection to be processed by the ATM switch.

16 Claims, 5 Drawing Sheets

U.S. PATENT DOCUMENTS

Figure 1:
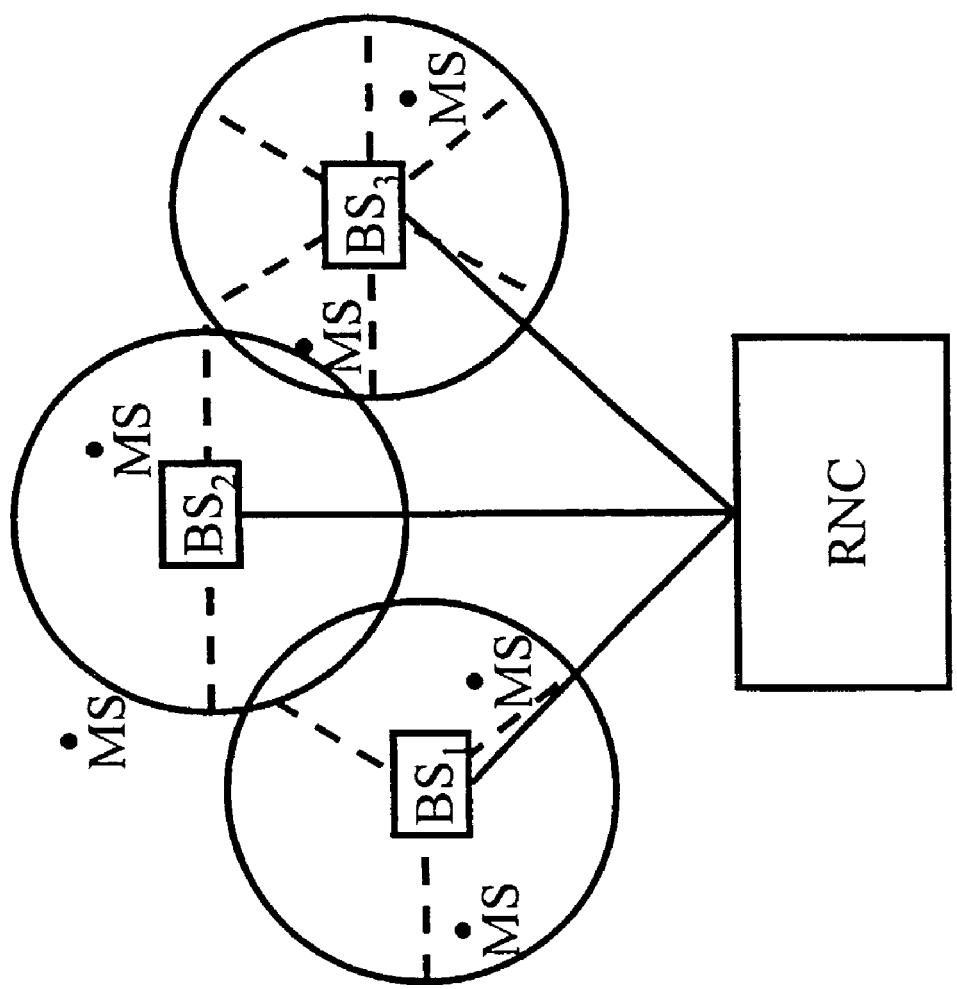

| | | | |
|---|---|---|---|
| 6,636,514 B1 * | 10/2003 | Caves | 370/395.1 |
| 6,639,916 B1 * | 10/2003 | Wakizaka | 370/397 |
| 6,804,246 B1 * | 10/2004 | Petersen et al. | 370/395.64 |
| 6,810,030 B1 * | 10/2004 | Kuo | 370/335 |
| 6,990,105 B1 * | 1/2006 | Brueckheimer et al. | 370/395.5 |

FOREIGN PATENT DOCUMENTS

| | | |
|---|---|---|
| GB | 2 322 515 A | 8/1998 |

OTHER PUBLICATIONS

Boldt M. et al.: "Modeling an ATM-based access network for 3rd generation mobile communication networks" VTC '98 48th IEEE Vehicular Technology Conference. Pathway to a Global Revolution (CAT. No. 98CH36151), VTC '98. 48th IEEE Vehicular Technology Conferences. Pathway to Global Wireless Revolution, Ottawa, Ont., Canada, May 18-21, 1998, pp. 2590-2593 vol. 3, XP002136953 1998, New York, NY, USA, IEEE, USA ISBN: 0-7803-4320-4.

Byung-Han Ryu et al.: "Performance evaluation for low bit-rate voice traffic in IMT-2000 network", Proceeding of IEEE, IEEE Region 10 Conference. Tencon 99. 'Multimedia Technology for Asia-Pacific Information Infrastructure' (CAT. No. 99CH37030), Proceedings of IEEE. IEEE Region 10 Conferences. Tencon 99. Multimedia Technology for Asia-Pacific Inf., Sep. 15-17, 2000, pp. 238-241 vol. 1 XP002136954.

* cited by examiner

Fig. 2 —PRIOR ART—

TELECOMMUNICATION NETWORK USING THE W-CDMA PROTOCOL WITH AAL-2 BASED TERMINATION POINTS

PRIORITY CLAIM

This is a national stage of PCT application No. PCT/EP99/07210, filed on Sep. 29, 1999. Priority is claimed on that application.

FIELD OF THE INVENTION

The present invention concerns telecommunication network using the W-CDMA protocol comprising a variety of base stations communicating with each other via a central Radio Network Controller by an ATM based data connection via an IUB interface whereby at least one of the base stations is comprising a variety of radio sectors with physically distributed AAL-2 based termination points, each termination point having a AAL-2 over ATM structure where different call ID's are mapped into ATM virtual connections under the control of a control unit timer with a given delay time, all AAL cell streams being sent parallel to each other to an ATM switching unit via an UTOPIA interface.

Moreover, the invention concerns an ATM (=Asynchronous Transfer Mode) switch for a telecommunication network mentioned above as well as a method for processing data within a telecommunication network mentioned above.

BACKGROUND OF THE INVENTION

The principal structure of a telecommunication network using the W-CDMA (Wideband-Code Division Multiple Access) protocol is known from practical knowledge. The structure and function of networks of that kind is known from ITU-T Recommendation I.362.2. Networks of this kind play on important role in the so called "Third Generation" telecommunication networks.

These kinds of networks use the AAL-2 (=ATM Adaptation Layer) over ATM standards as the protocols for broadband transmission. There are usually a variety of different base stations within the W-CDMA network each of which defining a cell. A cell, especially a cell covering an area with dense traffic can be divided into a number of sectors. Each of the sectors contains its own termination point for the AAL over ATM data. To each call in a given sector of a base station a call identification (call ID, CID) is allocated and a number of calls within a given sector is mapped into a single ATM virtual connection under use of the call ID.

The multiplexing/mapping of the different calls into one single ATM virtual connection at the respective termination point is governed by a control unit. The control unit comprises a control unit timer (CU timer) which supervises the mapping of the calls into the ATM cell which has a given length (53 bits, were 48 bits are reserved for the payload). Each ATM cell is filled with the data coming from different calls within a given sector until the ATM cell is full or the allowed CU timer limit is achieved which means that the given CU time is expired. The reason for the timer is to guarantee a maximum delay in the process of filling up the ATM cells in case if there are not enough data from the calls to be transmitted. This means, if the CU timer time expires, when the ATM cell is not yet filled, the ATM cell is transmitted only partially filled which results in a reduced efficiency.

This means, that a small value of the CU timer has the advantage that only small delay in the process of filling up the ATM cells is achieved but, that the probability of generating only partially filled cells is increased.

On the other hand, if the CU timer is set to a larger value, the probability of generating only partially filled cells is reduced but this does not guarantee the required maximum delay time. In an extrapolation, if the time delay of the CU timer would be infinite, the probability of filling all cells is 100 percent, which would result in the best efficiency of the ATM network.

An other problem raising is that the amount of simultaneous calls that a single sector of a base station has to handle may not be enough to make the usage of the ATM bandwidth effective enough. Theoretical valuations have shown that the use of AAL-2 over ATM technology is only efficient if the number of CIDs in a single ATM virtual connection is at least 50.

SUMMARY OF THE INVENTION

It is therefore the object of the present invention to increase the efficiency of the telecommunication network without a drop of the required maximum delay time.

This object is achieved in a system mentioned above by the ATM switching unit comprising a multiplexing unit for multiplexing AAL-2 connections of the different termination points TP into one single ATM virtual connection to be processed by the ATM switch.

Accordingly, this object is achieved by a method for operating a network mentioned above by the parallel incoming ALL-2 connections of different termination points of one base station being multiplexed into one single ATM cell virtual connection before being processed by the ATM switch.

It is the central idea of the present invention to propose a system and a method to increase the bandwidth usage efficiency by combining the parallel data traffic coming from different sectors of one base station before it is processed by the ATM switch. The incoming parallel data streams from the physically distributed termination points at the AAL-2 layer are multiplexed at a centralized location which leads to a very high efficiency because now—also for non-infinite delay times—the ATM virtual connections are processed with a very high occupancy rate. Nevertheless, the different sectors of the base station are still able to generate AAL-2 cells and transfer them to the multiplexing unit by using the standard UTOPIA interface. For all parallel data paths parts before the multiplexer, the CU time for mapping the AAL cells can be selected small so that low delay is guaranteed. Accordingly, at this part of the network the probability for partially filled cells is still large and a number of CID values used by the different BS sectors can still be small. After the multiplexing step, however, the number of CIDs used in the single ATM virtual connection is now significantly larger because the data stream combines all calls coming from different sectors of the base station. This means that the "dummy information" which was contained in the AAL cells at the UTOPIA interface before the multiplexing operation is removed by which the efficiency of the whole system is remarkably enhanced.

A preferred embodiment of the system is characterized in that both the AAL-2 stream coming from the individual radio sectors and the multiplexed AAL-2 stream have independent CU-timers. Due to the independent CU-timers a bound in the delay across the AAL-2 layer entities is guaranteed.

A further improvement of the described system may foresee that the CU timer used in the AAL-2 multiplexing unit has a larger value than the CU timer of the parallel data streams before the multiplexing unit. By this, the probability of occupancy of the ATM cells is further increased which means that the efficiency of the bandwidth usage is further increased.

It is emphasized that because of the fact that the system mentioned above is based on variable bit rated data processing, the bandwidth of each channel corresponding to a respective termination point of the base station may vary notwithstanding the fact that the system is still capable of processing the data as described above.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

The invention is now illustrated by means of an embodiment as depicted in the drawings.

Figure 2:
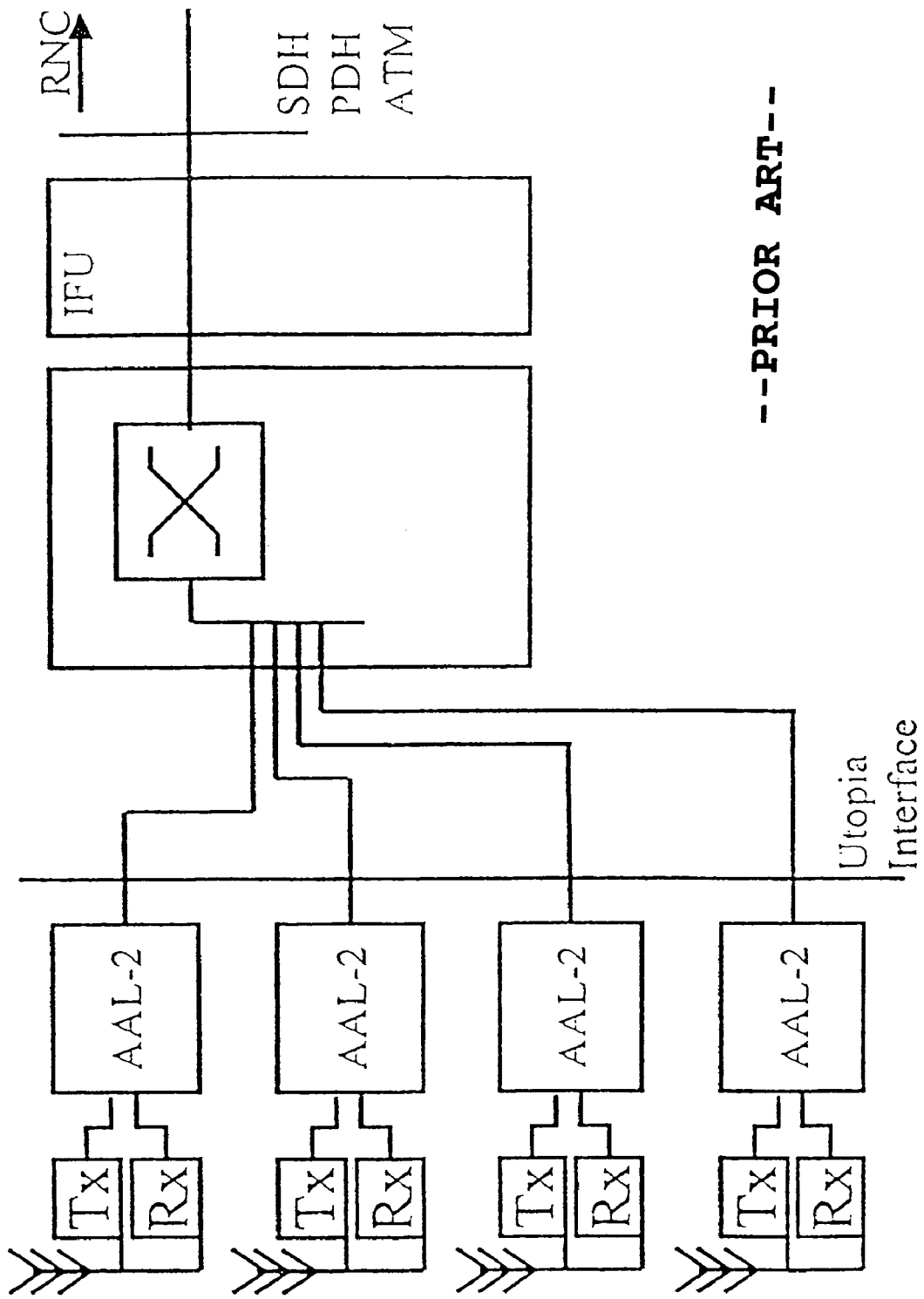
Figure 3:
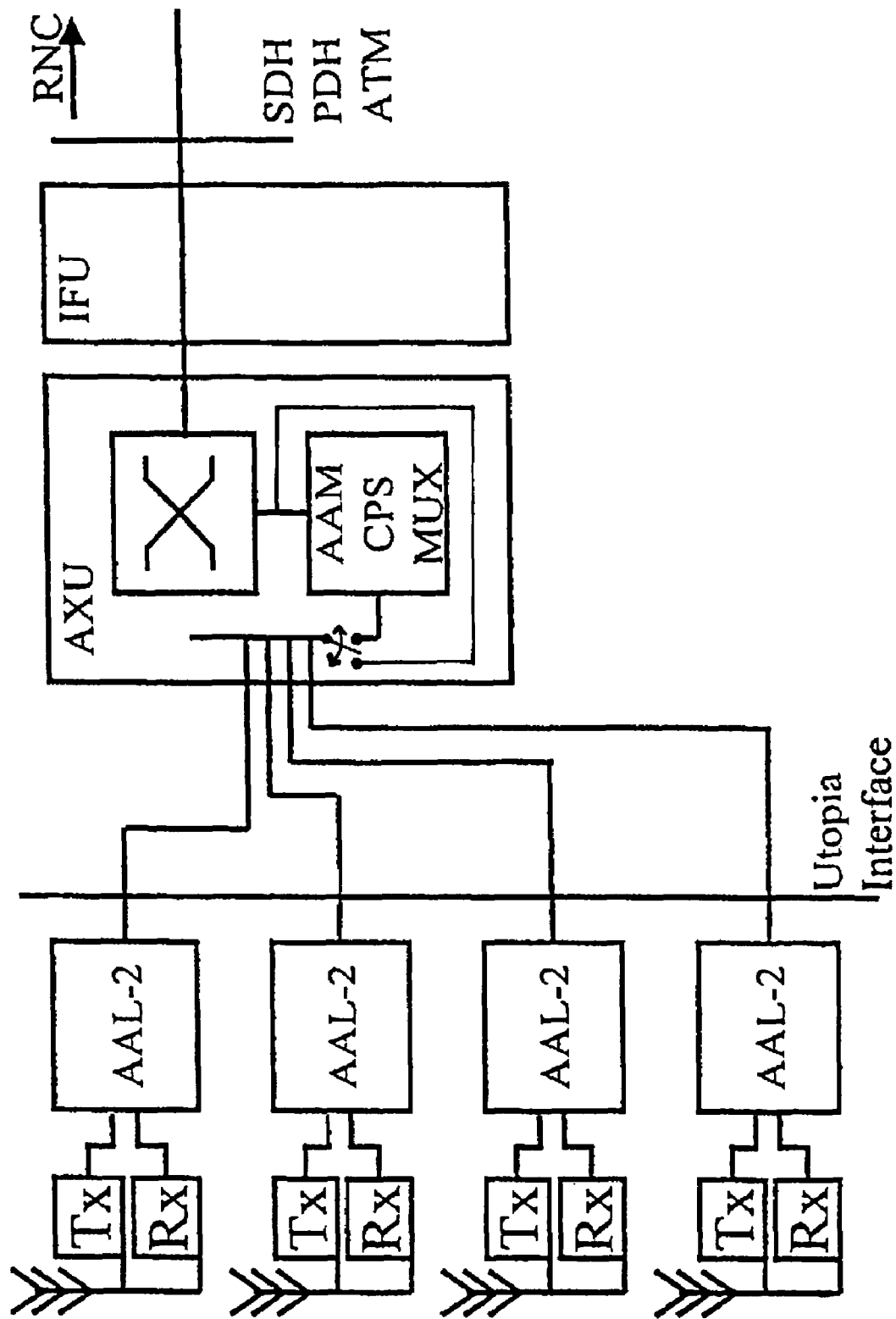
Figure 4:
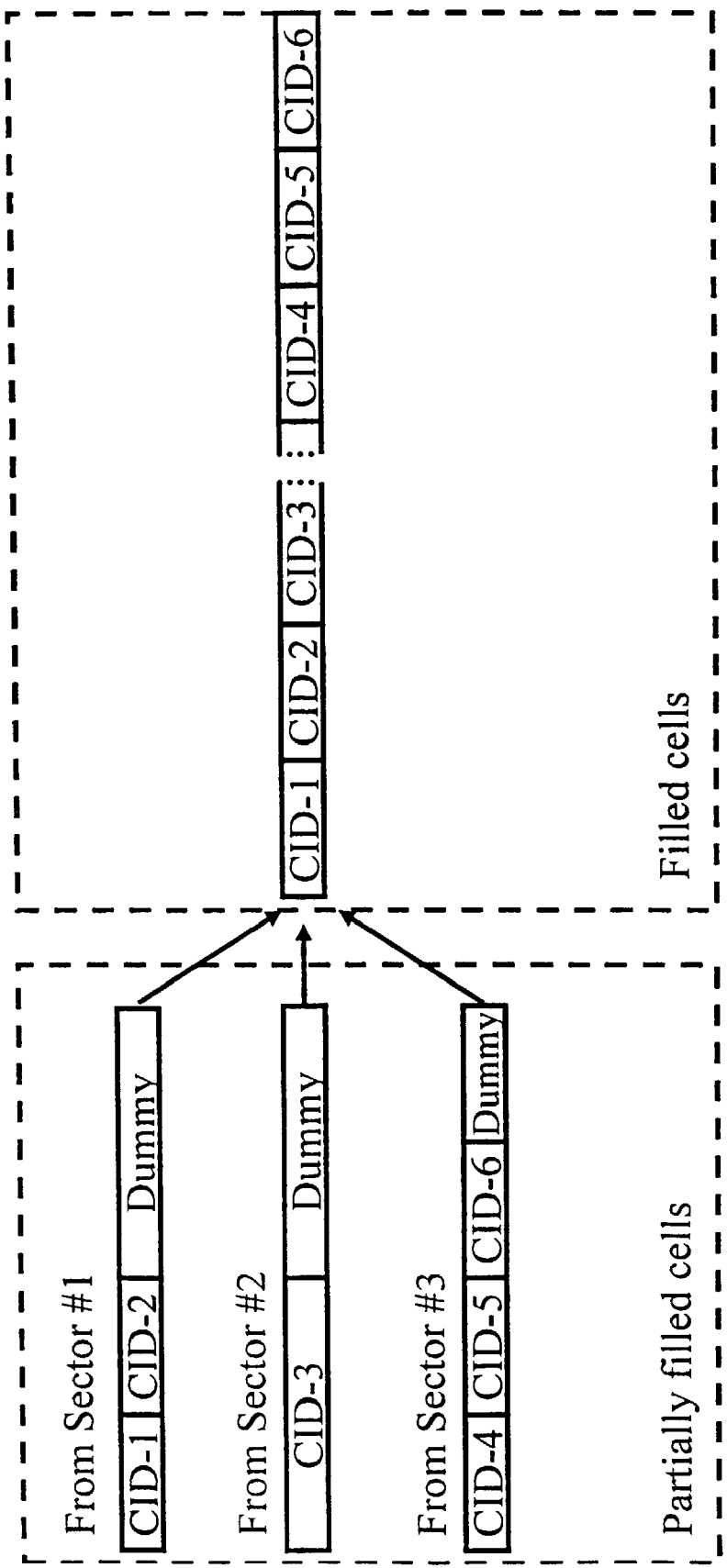
Figure 5:
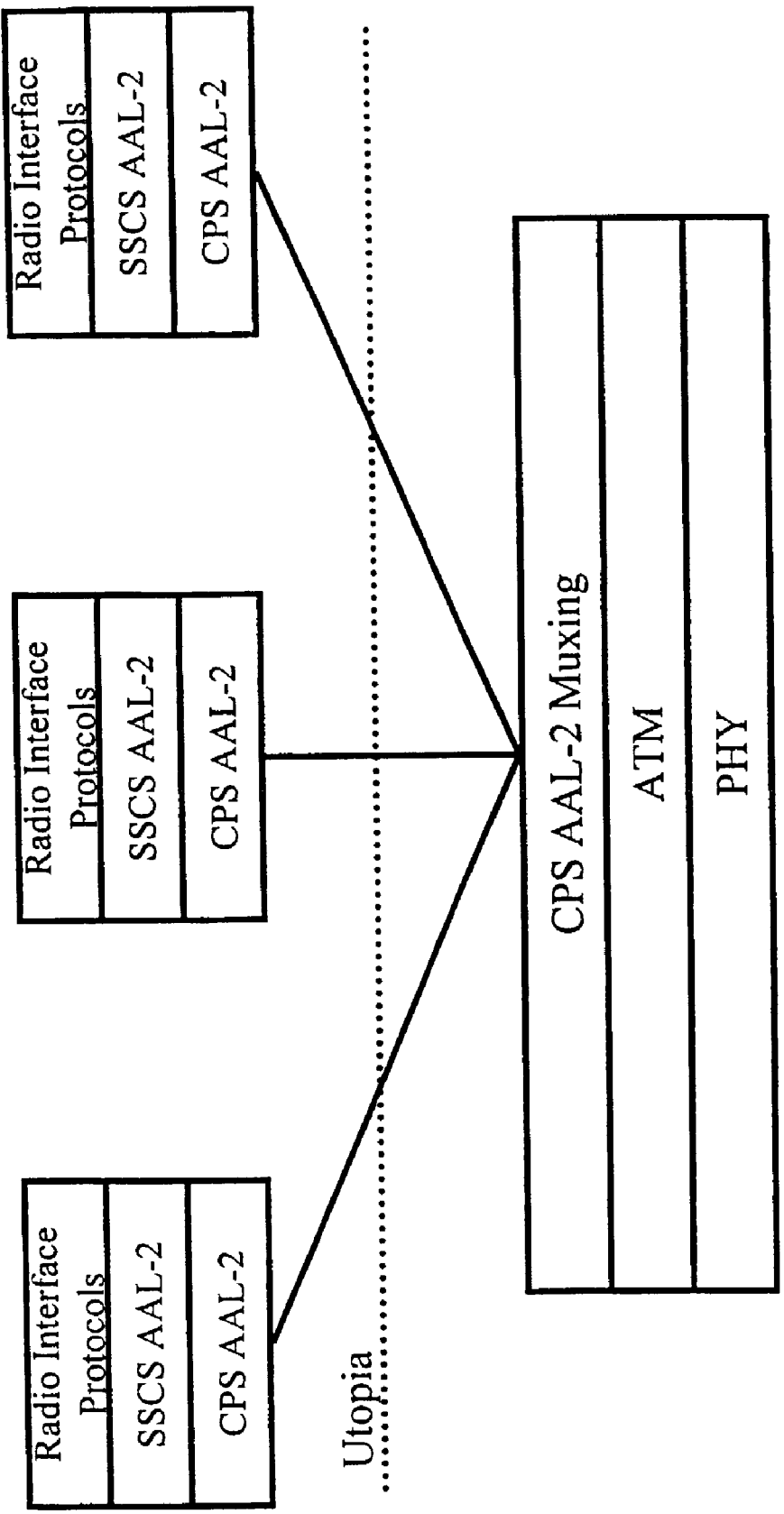

FIG. 1 shows a general set up of a telecommunication network according to the prior art FIG. 2 shows a detail of FIG. 1 directed to the data processing between the base station and the radio network controller RNC FIG. 3 shows a modification of the ATM switch unit of FIG. 2 according to the embodiment of the present invention FIG. 4 illustrates the functional principles of the present invention by means of a cell diagram and FIG. 5 shows the protocol stack for the multiplexing unit according to the present invention.

DETAILED DESCRIPTION OF THE PRESENTLY PREFERRED EMBODIMENTS

As can be seen from FIG. 1, in a conventional telecommunication network different base stations BS are comprised each of which defining a cell (depicted by a circle). The base stations are communicating with a central radio network controller RNC via a broadband data connection using an $I_{UB}$ interface. Within a given cell, the identification and information of a call of a given mobile station MS is received via the antenna of a given base station, processed through a receiver in which the data are digitalized and transmitted to a termination point. From the termination point the data are transmitted to the Radio Network Controller RNC via the AAL-2 over ATM standard technology.

As also shown in FIG. 1, each cell is divided in different sectors, where as each sector has its own termination point. The division of a cell in a variety of sections is preferred for those cells which have a lot of traffic.

The data processing for a base station with a variety of sectors is shown in FIG. 2.

The calls received in the different sectors are digitalized and processed by separate units each of which having separate termination points. It is clear that the termination points are usually physically distributed, i.e. that they are located in different areas. Their distance may vary between a few centimeters up to hundreds of meters.

Each of the data streams leaving the termination points of the different sectors of one base station are processed in parallel and are sent to an ATM switch where they are processed to the Iue interface communicating with the central radio network controller RNC. The data traffic between the different termination points and the ATM switch uses a known so-called "UTOPIA" interface.

FIG. 3 shows a block diagram of a network according to the present invention. This embodiment refers to a "Third Generation" Telecommunication Network. Generally, it corresponds to the system as described related with FIG. 2. In contrast to that, however, between each of the parallel outgoing data lines coming from the different termination points of the base station on one hand and the ATM switch AXU on the other hand, a multiplexing unit AAM CPS MUX is comprised. In this unit the different cells coming from different base station sectors are combined into the same virtual connection of an ATM cell arriving at the ATM switch. According to another embodiment of he present invention, the multiplexing unit includes a switchable bypass line. The switchable bypass line allows to direct the AAL-2 cell streams received from the termination points directly to the ATM switch, thus bypassing the multiplexing unit. The multiplexing unit may also comprise a plug-in unit. A plug-in unit is well-known in the art is a hardware or software module that adds a specific feature or service to a larger system.

This process is shown in FIG. 4.

The calls received in sector 1 of a given base station are named e.g. CID-1 and CID-2 and are mapped in the AAL-2 over ATM cell coming from the termination point of sector 1. It is shown that because of the fixed length of an ATM cell some space is left free "DUMMY" which means that an only partially filled cell is transmitted from sector 1. Accordingly, from sector 2 only one call-ID (CID-3) is transmitted which means that even more of the ATM cell is transmitted unfilled. The same refers to the calls coming from sector 3 as also shown in FIG. 4. After the multiplexing process in unit AAM CPS MUX, ATM cells are transmitted which are completely filled because the space available in a given cell is filled with the remaining payload originating from another cell coming from a different radio sector. For example as shown in FIG. 4, the first cell coming from sector 1 is filled up with the data coming from sector 2 (CID-3) until the first cell is filled and the rest of the information of CID-3 is mapped into the second ATM cell after which the rest of this second cell is filled with the traffic coming from sector 3. Therefore, the number of CID-s used in a single ATM VCC is now significantly larger because it combines calls coming from different base stations sectors. Moreover, the dummy information contained before in the AAL-2 cells at the UTOPIA interface between the BS sectors and the multiplexing unit is removed.

Even if the time delay used for the coding of the AAL cells within the base station sectors is kept small in order to allow a low maximum delay, the occupancy rate of the ATM cell processed to the ATM switch, e.g. after multiplexing, is very high. By this the efficiency of the bandwidth usage of the system is significantly increased.

FIG. 5 shows the corresponding protocol stack for the multiplexing unit according to the present invention.

In the lower part of FIG. 5 the first three layers (PHY, ATM, CPS, AAL-2 Muxing) of the multiplexing unit are shown. These three layers are used by all instances of the upper layers, which are provided for each incoming data line individually.

The upper layers comprise the CPS AAL-2 layer and the SSC AAL-2 layer as well as radio interface protocol layers.

Thus, while there have been shown and described and pointed out fundamental novel features of the present invention as applied to a preferred embodiment thereof, it will be understood that various omissions and substitutions and changes in the form and details of the devices described and illustrated, and in their operation, and of the methods described may be made by those skilled in the art without departing from the spirit of the present invention. For example, it is expressly intended that all combinations of those elements and/or method steps which perform substantially the same function in substantially the same way to achieve the same results are within the scope of the invention.

Substitutions of elements from one described embodiment to another are also fully intended and contemplated. It is the intention, therefore, to be limited only as indicated by the scope of the claims appended hereto.

What is claimed is:

1. A system, comprising:
   a plurality of base stations communicating with a radio network controller by an asynchronous transfer mode based data connection, at least one of the plurality of base stations comprising a plurality of radio sectors having physically distributed asynchronous transfer mode adaptation layer 2 based termination points, each termination point having an asynchronous transfer mode adaptation layer 2 over asynchronous transfer mode structure for mapping different call ID's into an asynchronous transfer mode adaptation layer 2 cell stream of a single asynchronous transfer mode virtual connection under control of a control unit timer having a determined delay time; and
   an asynchronous transfer mode switching unit configured to receive all asynchronous transfer mode adaptation layer 2 cell streams sent parallel to each other from said termination points,
   wherein said asynchronous transfer mode switching unit comprises a multiplexer configured to multiplex said received asynchronous transfer mode adaptation layer 2 cell streams into a single asynchronous transfer mode virtual connection to be processed by an asynchronous transfer mode switch, and wherein a control unit timer used in said multiplexer has a larger value than a control unit timer used for said asynchronous transfer mode adaptation layer 2 cell streams.

2. The system of claim 1, wherein channels respectively corresponding to said termination points have different bandwidths.

3. The system of claim 1, wherein the multiplexer has a switchable bypass line.

4. The system of claim 3, wherein the multiplexer is a plug-in type unit.

5. An apparatus, comprising:
   a receiver configured to receive all asynchronous transfer mode adaptation layer 2 cell streams of respective asynchronous transfer mode virtual connections sent parallel to each other from physically distributed asynchronous transfer mode adaptation layer 2 based termination points of a plurality of radio sectors of a base station, wherein said base station is a base station out of a plurality of base stations configured to communicate with a radio network controller by an asynchronous transfer mode based data connection, and wherein each asynchronous transfer mode adaptation layer 2 cell stream contains different call IDs mapped into the asynchronous transfer mode adaptation layer 2 cell stream, in which said different call IDs are contained, under the control of a control unit timer, and
   a multiplexer configured to multiplex said received asynchronous transfer mode adaptation layer 2 cell streams into a single asynchronous transfer mode virtual connection to be processed by an asynchronous transfer mode switch, wherein a control unit timer used in said multiplexer has a larger value than a control unit timer used for said asynchronous transfer mode adaptation layer 2 cell streams.

6. A method, comprising:
   receiving all asynchronous transfer mode adaptation layer 2 cell streams of respective asynchronous transfer mode virtual connections sent parallel to each other from physically distributed asynchronous transfer mode adaptation layer 2 based termination points of a plurality of radio sectors of a base station, wherein said base station is a base station out of a plurality of base stations configured to communicate with a radio network controller by an asynchronous transfer mode based data connection, and wherein each asynchronous transfer mode adaptation layer 2 cell stream contains different call IDs mapped into the asynchronous transfer mode adaptation layer 2 cell stream, in which said different call IDs are contained, under the control of a control unit timer; and
   multiplexing said received asynchronous transfer mode adaptation layer 2 cell streams into a single asynchronous transfer mode virtual connection to be processed by an asynchronous transfer mode switch, wherein a control unit timer used in said multiplexing has a larger value than a control unit timer used for said asynchronous transfer mode adaptation layer 2 cell streams.

7. The system of claim 2, wherein the multiplexer has a switchable bypass line.

8. The apparatus of claim 5, wherein the multiplexer has a switchable bypass line.

9. The apparatus of claim 5, wherein the multiplexer is a plug-in type unit.

10. The method of claim 6, wherein the multiplexing is performed in a multiplexer.

11. The method of claim 10, wherein the multiplexer has a switchable bypass line.

12. The method of claim 10, wherein the multiplexer is a plug-in type unit.

13. An apparatus, comprising:
    means for receiving all asynchronous transfer mode adaptation layer 2 cell streams of respective asynchronous transfer mode virtual connections sent parallel to each other from physically distributed asynchronous transfer mode adaptation layer 2 based termination points of a plurality of radio sectors of a base station, wherein said base station is a base station out of a plurality of base stations configured to communicate with a radio network controller by an asynchronous transfer mode based data connection, and wherein each asynchronous transfer mode adaptation layer 2 cell stream contains different call IDs mapped into the asynchronous transfer mode adaptation layer 2 cell stream, in which said different call IDs are contained, under the control of a control unit timer, and
    means for multiplexing said received asynchronous transfer mode adaptation layer 2 cell streams into a single asynchronous transfer mode virtual connection to be processed by an asynchronous transfer mode switch, wherein a control unit timer used in said multiplexer has a larger value than a control unit timer used for said asynchronous transfer mode adaptation layer 2 cell streams.

14. The apparatus of claim 5, wherein channels respectively corresponding to said termination points have different bandwidths.

15. The apparatus of claim 14, wherein the multiplexer has a switchable bypass line.

16. The apparatus of claim 8, wherein the multiplexer is a plug-in type unit.

* * * * *